US011745388B2

(12) United States Patent
Lautt

(10) Patent No.: US 11,745,388 B2
(45) Date of Patent: Sep. 5, 2023

(54) TWO PART COMPOUNDED MATERIAL MIXER

(71) Applicant: The Boeing Company, Chicago, IL (US)

(72) Inventor: Matthew N. Lautt, Mount Pleasant, SC (US)

(73) Assignee: The Boeing Company, Chicago, IL (US)

(*) Notice: Subject to any disclaimer, the term of this patent is extended or adjusted under 35 U.S.C. 154(b) by 850 days.

(21) Appl. No.: 16/664,365

(22) Filed: Oct. 25, 2019

(65) Prior Publication Data

US 2021/0122085 A1   Apr. 29, 2021

(51) Int. Cl.
| B29B 7/24 | (2006.01) |
| B01F 35/88 | (2022.01) |
| B01F 31/24 | (2022.01) |
| G05D 11/13 | (2006.01) |
| B01F 101/00 | (2022.01) |

(52) U.S. Cl.
CPC .............. B29B 7/242 (2013.01); B01F 31/24 (2022.01); B01F 35/8821 (2022.01); B29B 7/244 (2013.01); G05D 11/133 (2013.01); *B01F 2101/2805* (2022.01)

(58) Field of Classification Search
CPC .......... B29B 7/242; B29B 7/86; B29B 7/244; B29B 7/283; B29B 7/16; B01F 35/8821; B01F 2101/2805; B01F 31/40; B01F 35/7176; B01F 31/24; G05D 11/133
USPC ..................................................... 366/160.2
See application file for complete search history.

(56) References Cited

U.S. PATENT DOCUMENTS

| 4,403,866 A | * | 9/1983 | Falcoff | .................... | B01F 35/82 |
| | | | | | 366/132 |
| 4,799,801 A | * | 1/1989 | Bruning | .............. | B01F 35/7161 |
| | | | | | 366/184 |
| 6,793,387 B1 | * | 9/2004 | Neas | .................... | B01F 33/841 |
| | | | | | 222/106 |

(Continued)

FOREIGN PATENT DOCUMENTS

| WO | WO-2018067443 A1 | * | 4/2018 | ............. C08G 75/02 |
| WO | 2023/047359 | * | 3/2023 | |

OTHER PUBLICATIONS

"Semco 1088 CE Mixer: Operating Instructions & Troubleshooting Guide", Jun. 2018, PPG Industries, Semco Packaging and Application Systems, 33 pages.

(Continued)

*Primary Examiner* — Charles Cooley
(74) *Attorney, Agent, or Firm* — Yee & Associates, P.C.

(57) ABSTRACT

A method, apparatus, and system for mixing a compounded material. A first selected amount of a base part for the compounded material and a second selected amount of an activator part for the compounded material to form a total amount of the compounded material is determined. The first selected amount of the base part is pumped by a pump system from a set of base part sources connected to the pump system into a container. The second selected amount of the activator part is pumped by the pump system from a set of activator part sources connected to the pump system into a container. The base part and the activator part in the container are mixed by a mixing system for a predetermined amount of time that is sufficient to activate the compounded material for use.

20 Claims, 8 Drawing Sheets

(56) References Cited

U.S. PATENT DOCUMENTS

| | | | | |
|---|---|---|---|---|
| 6,917,424 | B2* | 7/2005 | Rodrigues | C09B 67/0066 |
| | | | | 356/326 |
| 6,969,190 | B1* | 11/2005 | McClain | C09D 5/02 |
| | | | | 366/605 |
| 7,264,160 | B2* | 9/2007 | Polarine | G07C 3/08 |
| | | | | 235/385 |
| 7,905,654 | B1* | 3/2011 | Cordero | B01F 31/445 |
| | | | | 366/256 |
| 7,942,569 | B2* | 5/2011 | Orben | B01F 33/84 |
| | | | | 366/208 |
| 8,936,390 | B2* | 1/2015 | Hughes | B08B 3/02 |
| | | | | 366/605 |
| 10,815,408 | B2* | 10/2020 | Zook | C08L 81/04 |
| 2007/0253280 | A1* | 11/2007 | Orben | B01F 35/881 |
| | | | | 366/160.5 |
| 2016/0262573 | A1* | 9/2016 | Biglari | B01F 35/2117 |
| 2016/0310362 | A1* | 10/2016 | Lane | F16K 99/0042 |
| 2017/0312716 | A1* | 11/2017 | Konrad, Jr. | B01F 25/30 |
| 2020/0070112 | A1* | 3/2020 | Darmstaedter | B01F 33/84 |
| 2021/0122085 | A1* | 4/2021 | Lautt | B01F 31/40 |

OTHER PUBLICATIONS

"Semco 1088 HE Mixer: Operating Instructions & Troubleshooting Guide", Jun. 2018, PPG Industries,, Semco Packaging and Application Systems, 31 pages.

"Semco Packaging & Application Systems: Where Smart Solutions Take Flight", 2010, PPG Industries, Semco Packaging and Application Systems, 32 pages.

"Semco Model 1088 Semkit Package Mixer: Technical Data", Nov. 2015, PPG Industries, Semco Packaging and Application Systems, 2 pages.

* cited by examiner

TWO PART COMPOUNDED MATERIAL MIXER

BACKGROUND INFORMATION

1. Field

The present disclosure relates generally to manufacturing products and, in particular, to a method and apparatus for forming a compounded material for use in manufacturing products or preforming maintenance on products.

2. Background

Sealants are commonly used in manufacturing products. For example, sealants may be used to form a mechanical seal that blocks the passage of fluids through a surface, a joint, or an opening in a structure. Sealants can also function to block dust, sound, and heat transmission.

Sealants have a limited shelf life. For example, a premixed sealant in a frozen form can be stored for a short period of time, such as 43 days, when received from a manufacturer. Thereafter, the sealant is disposed of using procedures from the manufacturer of the sealant. Depending on the amount of sealant used, large amounts of sealants can expire and need to be disposed of.

Therefore, it would be desirable to have a method and apparatus that take into account at least some of the issues discussed above, as well as other possible issues. For example, it would be desirable to have a method and apparatus that overcome a technical problem with the limited shelf life of premixed sealants.

SUMMARY

An embodiment of the present disclosure provides a material mixing system comprising an optional platform, a pump system, and a controller. The pump system is optionally connected to the optional platform. The pump system operates to pump a base part and an activator part for a compounded material into a container. The mixing system is connected to the optional platform. The mixing system operates to mix the base part and the activator part for the compounded material in the container. The controller is in communication with the pump system and the mixing system. The controller operates to control the pump system to pump a first selected amount of the base part and a second selected amount of the activator part for the compounded material into the container in which the first selected amount and the second selected amount is based on a total amount of the compounded material to be activated for use and control the mixing system to mix the base part and the activator part in the container for a predetermined amount of time that is sufficient to activate the compounded material for use.

Another embodiment of the present disclosure provides a material mixing system comprising a computer system and a controller in the computer system. The controller operates to control a pump system to pump a first selected amount of a base part for a material and a second selected amount of an activator part for the material into a container in which the first selected amount and the second selected amount is based on a total amount of the material to be activated for use. The controller operates to control a mixing system to mix the base part for the material and the activator part for the material in the container for a predetermined amount of time that is sufficient to activate the material for use.

Yet another embodiment of the present disclosure provides a method for mixing a compounded material. A first selected amount of a base part for the compounded material and a second selected amount of an activator part for the compounded material to form a total amount of the compounded material is determined by a controller. The first selected amount of the base part is pumped by a pump system under the control of the controller from a set of base part sources connected to the pump system into a container. The second selected amount of the activator part is pumped by the pump system under the control of the controller from a set of activator part sources connected to the pump system into a container. The base part and the activator part in the container are mixed by a mixing system under the control of the controller for a predetermined amount of time that is sufficient to activate the compounded material for use.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account one or more different considerations. For example, the illustrative embodiments recognize and take into account that sealants can come in an unmixed form in which the parts can be stored for a longer amount of time than a premixed sealant. The illustrative embodiments recognize and take into account that the parts of a two part sealant can be stored at room temperature for six months in contrast to 42 days in a frozen form for a premixed sealant.

The illustrative embodiments recognize and take into account that, currently, parts for two part sealants come in packages with preselected amounts. For example, the illustrative embodiments recognize and take into account that packages for a two part sealant can come in sizes such as 6 ounces, 12 ounces, or 20 ounces. The illustrative embodiments recognize and take into account that if 14 ounces of sealant are needed, a human operator may mix a 20 ounce package.

In this case, the illustrative embodiments recognize and take into account that six ounces of sealant may be left over and frozen. The illustrative embodiments recognize and take into account that the remaining six ounces of the sealant can be frozen and used up to 42 days later. If the sealant is not used within 42 days, the illustrative embodiments recognize and take into account that the sealant is no longer usable and is disposed of, resulting in undesired waste.

Thus, the illustrative embodiments provide a method, apparatus, and system for mixing a compounded material. In one illustrative example, a controller determines a first selected amount of a base part for a compounded material and a second selected amount of an activator part for the compounded material to form a total amount of the compounded material.

A pump system controlled by the controller pumps the first selected amount of the base part from a set of base part sources connected to the pump system, and pumps the second selected amount of the activator part from a set of activator part sources connected to the pump system into a container. A mixing system controlled by the controller mixes the base part and the activator part in the container for a predetermined amount of time that is sufficient to activate the compounded material for use.

As used herein, a "set of," when used with reference to items means one or more items. For example, a "set of base part sources" is one or more base part sources.

As used herein, the term "activate" or "to activate the compounded material for use" means to change the chemical, physical, and/or other properties of the base part and/or activator part upon mixing of the base part and the activator part.

Figure 1:
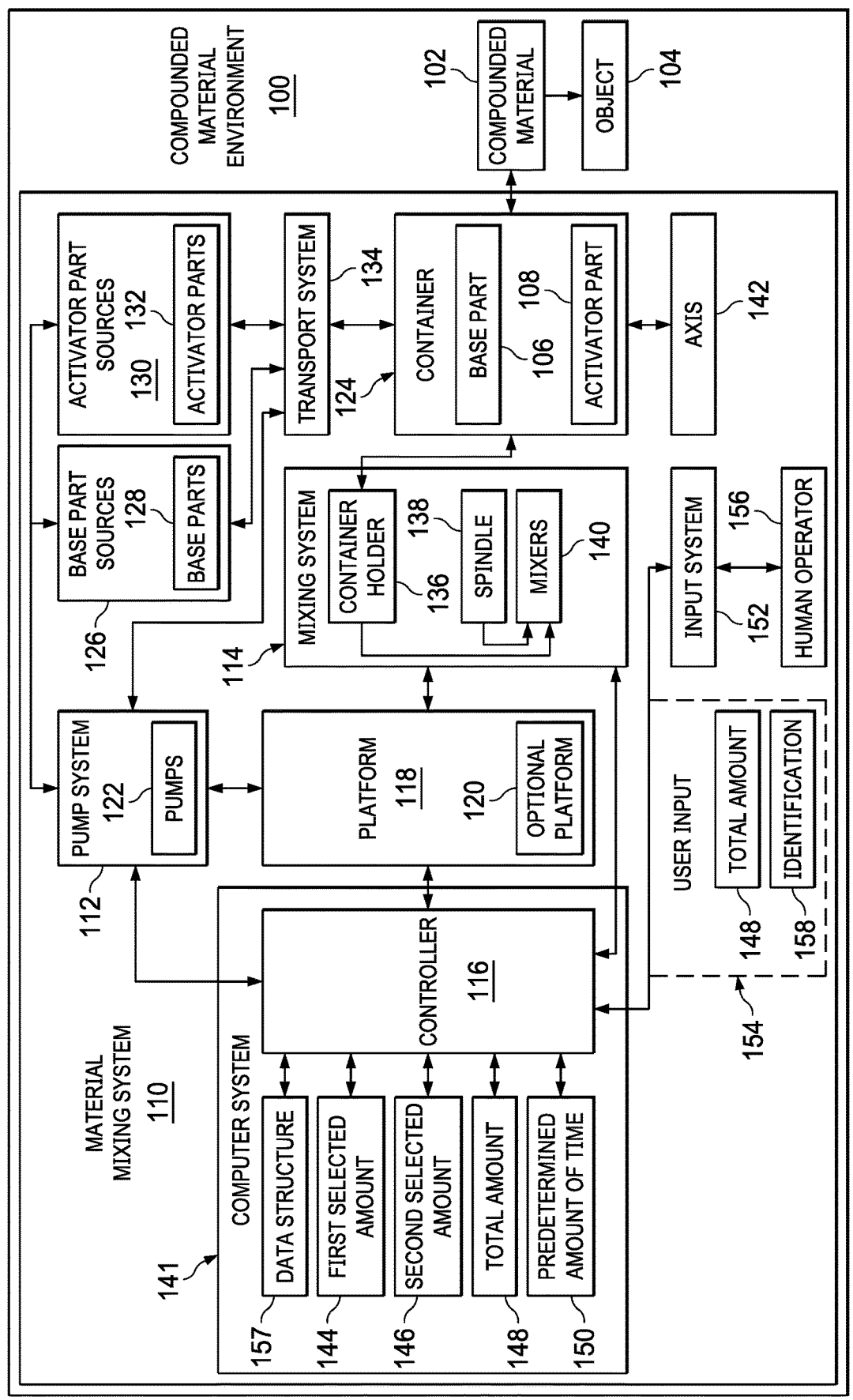
FIG. 1 is an illustration of a block diagram of a compounded material environment in accordance with an illustrative embodiment.

With reference now to FIG. 1, an illustration of a block diagram of a compounded material environment is depicted in accordance with an illustrative embodiment. Compounded material environment 100 is an environment in which compounded material 102 can be mixed for use on object 104.

As depicted, object 104 can take a number of different forms. For example, object 104 can be a mobile platform, a stationary platform, a land-based structure, an aquatic-based structure, a space-based structure, an aircraft, an airplane, a rotorcraft, a surface ship, a tank, a personnel carrier, a train, a spacecraft, a space station, a satellite, a submarine, an automobile, a power plant, a bridge, a dam, a house, a manufacturing facility, a building, a fuselage, a fairing, an engine, a skin panel, a wing box, a door, a joint, a hydraulic system, a wiring harness, a part, a subassembly, or some other suitable type of object for which compounded material 102 can be used for manufacturing or maintenance.

In this illustrative example, compounded material 102 can take a number of different forms. For example, compounded material 102 can be at least one of a paste, a silicon sealant, a polysulfide sealant, a urethane sealant, an epoxy adhesive, a solvent free adhesive, a resin, an epoxy, or some other suitable type of compounded material 102.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As depicted, compounded material 102 is formed from mixing base part 106 and activator part 108. Activator part 108 can be added to base part 106 and mixed for a set period of time prior to use of compounded material 102. In illustrative example, mixing involves combining or putting together base part 106 and activator part 108 to form a single substance, compounded material 102. The mixing can be performed such that base part 106 and activator part 108 cannot be easily separated in compounded material 102. In this illustrative example, the mixing of base part 106 and activator part 108 is performed such that compounded material 102 has desired or intended properties.

For example, if compounded material 102 is a polysulfide sealant, base part 106 and activator part 108 are mixed such that the polysulfide sealant has values for properties selected from at least one of a pot life, a tack free time, an initial cure time, a hardness, a tensile strength, a bond durability, or other suitable properties.

In this illustrative example, compounded material 102 can be formed using material mixing system 110. Material mixing system 110 comprises a number of different components. As depicted, material mixing system 110 comprises pump system 112, mixing system 114, and controller 116.

In this illustrative example, material mixing system 110 can also include platform 118. In this example, at least one of pump system 112, mixing system 114, and controller 116 can be connected to platform 118.

When one component is "connected" to another component, the connection is a physical association. For example, a first component, pump system 112, can be considered to be physically connected to a second component, platform 118, by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

As depicted, platform 118 is optional platform 120. In another illustrative example, these different components can be connected or placed on other structures in different locations in compounded material environment 100 without needing platform 118. As another example, pump system 112 can be optionally connected to optional platform 120.

Optional platform 120 can take a number of different forms. For example, optional platform 120 can be a solid structure, a frame, a housing with a cavity, a frame, a shell, or some other object that can be used for at least one of supporting or holding components such as pump system 112, mixing system 114, and controller 116.

Optional platform 120 can be constructed from various materials. For example, optional platform 120 can be comprised of materials selected from at least one of a metal, an aluminum, a composite material, a plastic, a polycarbonate, or other suitable materials.

In this illustrative example, pump system 112 comprises a set of pumps 122 that moves base part 106 and activator part 108 into container 124 for mixing. The set of pumps 122 can take a number of different forms. For example, the set of pumps 122 can be selected from at least one of a piston pump, a syringe pump, a syringe driver, an axial flow pump, an axial piston pump, or some other mechanical device. In the illustrative example, the set of pumps 122 in pump system 112 operates to pump base part 106 and activator part 108 for compounded material 102 into container 124.

Container 124 is a physical structure that is selected to hold base part 106 and activator part 108 for mixing to form compounded material 102. Container 124 can take a number of different forms and have a number of different shapes. For example, container 124 can be a tube with one opening, a tube with two openings, a jar, or a metal tube for a syringe. Container 124 can have different cross-sections. For example, container 124 can have a cross-section in the shape of a circle, a square, a hexagon, an irregular shape, or some other suitable shape. Further, container 124 can have a constant diameter or can be tapered depending on the implementation.

In this illustrative example, pump system 112 pumps base part 106 from a set of base part sources 126. Pump system 112 pumps activator part 108 from a set of activator part sources 130.

For example, a first set of pumps 122 is connected to a set of base part sources 126 and operates to pump base parts 128 from the set of base part sources 126 into container 124. A second set of pumps 122 is connected to a set of activator part sources 130 and operates to pump activator parts 132 from the set of activator part sources 130 into container 124.

As depicted, the set of base part sources 126 is comprised of a set of physical structures that hold base parts 128 including base part 106. The set of activator part sources 130 is comprised of a set of physical structures that hold activator parts 132 including activator part 108. The structures can be, for example, syringes, containers, cylinders, drums, tubes, or other suitable structures for holding base parts 128 and activator parts 132.

In this illustrative example, pump system 112 can be connected to the set of base part sources 126 and the set of activator part sources 130 by transport system 134. Additionally, transport system 134 also connects pump system 112 to container 124.

In other illustrative examples, transport system 134 can directly connect the set of base part sources 126 and the set of activator part sources 130 to container 124. In this case, pump system 112 can apply at least one of pressure, vacuum, or other types of force to cause base parts 128 and activator parts 132 to move through transport system 134 to container 124. As a result, different types of compounded material 102 can be mixed by material mixing system 110.

Transport system 134 can be comprised of a number of different components. For example, transport system 134 can be comprised of at least one of a tube, a rigid tube, a flexible tube, a hose, a conduit, a hollow cylinder, a pipe, or some other hollow structure that can transport base part 106 from a set of base part sources 126 to container 124 and transport activator part 108 from the set of activator part sources 130 to container 124. Further, the set of base part sources 126 can hold different types of base parts 128, and the set of activator part sources 130 can hold different types of activator parts 132.

In this illustrative example, base parts 128 in the set of base part sources 126 can be of the same or different types of base parts 128. In a similar fashion, activator parts 132 in the set of activator part sources 130 can be the same or different types of activator parts 132. For example, when different types of base parts 128 and activator parts 132 are present, the set of base part sources 126 can correspond to a set of types of base parts 128, and the set of activator part sources 130 can correspond to a set of types of activator parts 132.

The particular base part selected from base parts 128 and the particular active part selected from activator parts 132 can be based on the type of compounded material 102 that is desired. For example, a first base part in the set of base parts 128 and a first activator part in the set of activator parts 132 can be for a sealant. A second base part in the set of base parts 128 and a second activator part in the set of activator parts 132 can be for an adhesive.

In this illustrative example, mixing system 114 is connected to optional platform 120. As depicted, mixing system 114 operates to mix base part 106 and activator part 108 for compounded material 102 in container 124.

In this illustrative example, mixing system 114 includes a number of different components. For example, mixing system 114 can include at least one of container holder 136, spindle 138, a set of mixers 140, or other suitable components that can be used to mix compounded material 102 from base part 106 and activator part 108.

In this illustrative example, container holder 136 is moveable along axis 142 extending centrally though container 124 when container 124 is placed into container holder 136. Spindle 138 is rotatable about axis 142 extending centrally though container 124 when container 124 is placed into container holder 136. During operation of mixing system 114, at least one of container holder 136 moves along axis 142 or spindle 138 rotates about axis 142 to move the set of mixers 140 such that base part 106 and activator part 108 in container 124 are mixed to activate compounded material 102.

In this illustrative example, the set of mixers 140 can take a number of different forms. For example, the set of mixers 140 can be selected from at least one of a static mixer, a mixing paddle, a whisk, a beater, a spiral mixer, or some other suitable type of mixer. In this illustrative example, a static mixer can be a plunger with channels that allow the parts to flow through from one side to the other side of the plunger as at least one of the plunger or container 124 moves relative to each other.

In the illustrative example, controller 116 can be located in computer system 141 and is in communication with pump system 112 and mixing system 114. Controller 116 controls the operation of material mixing system 110 to create compounded material 102.

Controller 116 can be implemented in software, hardware, firmware, or a combination thereof. When software is used, the operations performed by controller 116 can be implemented in program code configured to run on hardware, such as a processor unit. When firmware is used, the operations performed by controller 116 can be implemented in program code and data and stored in persistent memory to run on a processor unit. When hardware is employed, the hardware can include circuits that operate to perform the operations in controller 116.

In the illustrative examples, the hardware can take a form selected from at least one of a circuit system, an integrated circuit, an application-specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 141 is a physical hardware system that includes one or more data processing systems. When more than one data processing system is present, those data processing systems may be in communication with each other using a communications medium. The communications medium may be a network. The data processing systems may be selected from at least one of a computer, a server computer, a workstation, a tablet computer, a laptop computer, a mobile phone, or some other suitable data processing system.

In illustrative example, controller 116 is in communication with pump system 112 and mixing system 114. In the illustrative example, pump system 112 and mixing system 114 include at least one of a processor or other circuit that receives electrical signals from controller 116. The electrical signals control the operation of pump system 112 and mixing system 114. The communication is facilitated using at least one of a wired communications link or a wireless communications link.

As depicted, controller 116 operates to control pump system 112 to pump first selected amount 144 of base part 106 and second selected amount 146 of activator part 108 for compounded material 102 into container 124 in which first selected amount 144 and second selected amount 146 are based on total amount 148 of compounded material 102 to be activated for use. Container 124 can have a size that is selected to hold at least total amount 148 of compounded material 102. In an illustrative example, container 124 can have a size that holds a greater amount of material than total amount 148. Further, controller 116 operates to control mixing system 114 to mix base part 106 and activator part 108 in container 124 for predetermined amount of time 150 that is sufficient to activate compounded material 102 for use.

As depicted, material mixing system 110 can also include input system 152. In this illustrative example, input system 152 is in communication with controller 116. Input system 152 can operate to receive user input 154 from human operator 156 in which user input 154 selecting total amount 148 of compounded material 102 to be activated and sends user input 154 to controller 116.

In this illustrative example, input system 152 can include one or more different devices. For example, input system 152 can be selected from at least one of a physical control connected to optional platform 120, a human machine interface (HMI), a touch screen display, a mobile phone, a tablet computer, a client computer, smart glasses, a server computer, or some other suitable device.

With input system 152, controller 116 can receive user input 154 from input system 152. User input 154 includes total amount 148 of compounded material 102 to be activated. Controller 116 determines first selected amount 144 for base part 106 based on total amount 148 of compounded material 102 to be activated and second selected amount 146 for activator part 108 based on total amount 148 of compounded material 102 to be activated.

In the illustrative example, first selected amount 144 for base part 106 and second selected amount 146 for activator part 108 can be determined from data structure 157 accessed by controller 116. Data structure 157 can take a number of different forms. For example, data structure 157 can be a table, a spreadsheet, a database, or some other data structure that identifies the first selected amount of the base part and the second selected amount of the activator part that is needed for a particular total amount of the compounded material.

Additionally, user input 154 can also include identification 158 of the type of compounded material 102 to be mixed. With identification 158 of the type of compounded material 102, the type of base part 106, and the type of activator part 108 can also be determined for use in selecting sources from the set of base part sources 126 and the set of activator part sources 130 to create the type of compounded material 102 that is desired.

In one illustrative example, one or more technical solutions are present that overcome a technical problem with the amount of waste of when using currently available premixed compounded materials and prepackaged two part compounded materials. As a result, the illustrative example provides one or more technical solutions that can provide a technical effect of reducing waste of compounded materials. The illustrative example reduces waste through customized mixing of compounded materials such that the desired amount of compounded materials can be mixed with reduced effort by human operators. In the illustrative examples, the operator-selected amount of compounded material desired and material mixing system 110 in the illustrative examples automatically determine and mix the appropriate amount of parts to form the desired amount of compounded material 102.

The illustration of compounded material environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, pump system 112 is described as being optionally connected to optional platform 120. In other illustrative examples, other components also can be optionally connected to optional platform 120 in addition to or in place of pump system 112. For example, controller 116 can be in a remote location to optional platform 120. In this example, controller 116 can be in communication with components such as pump system 112 and mixing system 114 using a wireless communications link.

In yet another illustrative example, data structure 157 can be a plurality of electrical circuits. Each circuit can correspond to a particular total amount of compounded material 102 that is desired. Controller 116 selects a particular electrical circuit based on user input 154. Each of the electrical circuits can operate control pump system 112 to pump first selected amount 144 and second selected amount 146 into container 124 based on the selection of total amount 148 through input system 152.

Figure 2:
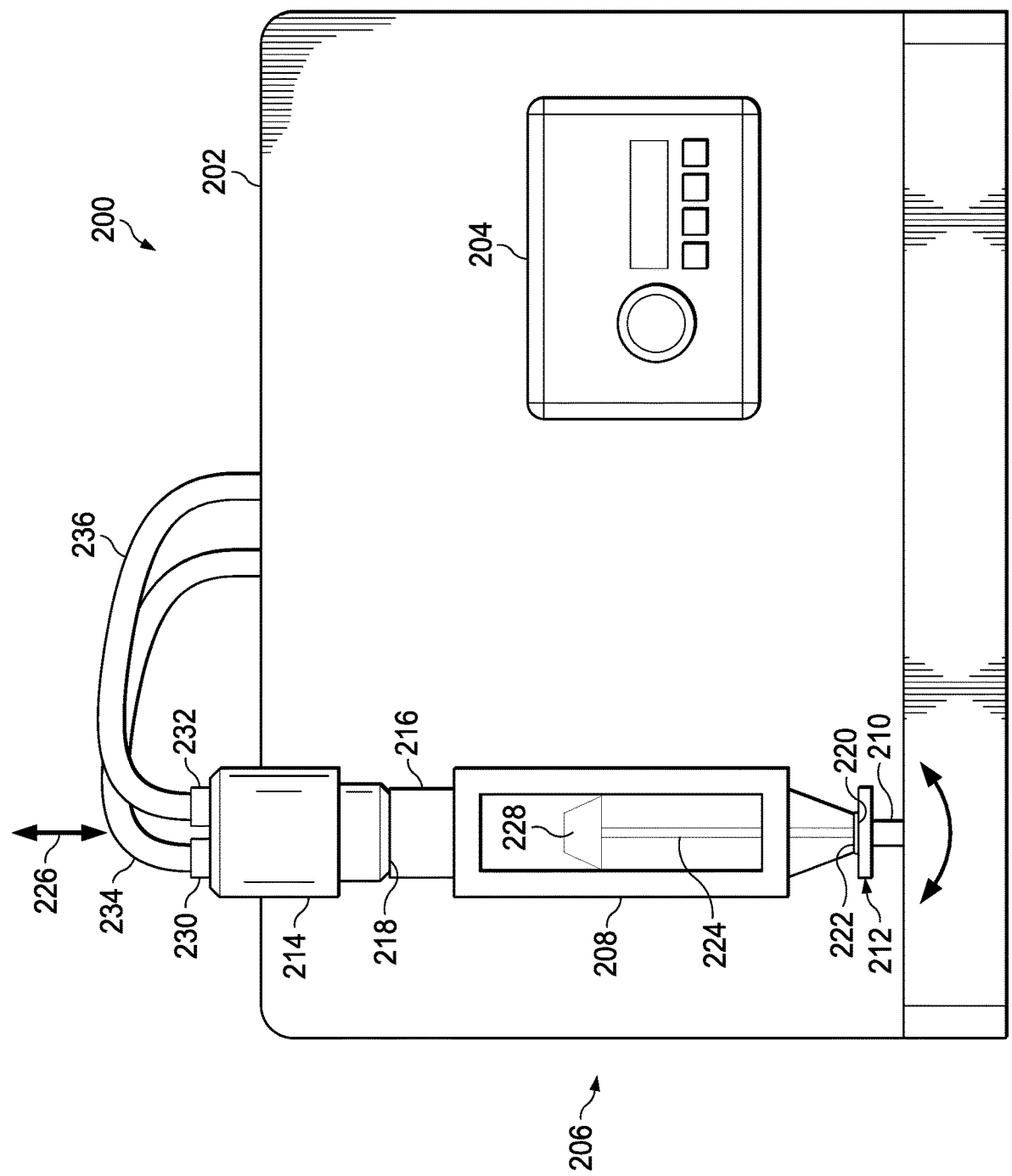
FIG. 2 is an illustration of a front view of a material mixing system in accordance with an illustrative embodiment.

With reference next to FIG. 2, an illustration of a front view of a material mixing system is depicted in accordance with an illustrative embodiment. In this illustrative example, material mixing system 200 is an example of one implementation for material mixing system 110 shown in block form in FIG. 1.

In this front, platform 202 is connected to controller 204 and mixing system 206. Controller 204 can be a processor, an application-specific integrated circuit (ASIC), or some other suitable component. In this illustrative example, controller 204 is a hardware device, such as a processor or an application-specific integrated circuit, and is an example of computer system 141 with controller 116 in FIG. 1. In this illustrative example, controller 204 is in communication with mixing system 206 using communications links such as a wireless or wired communications link (not shown).

Mixing system 206 comprises a number of different components. As depicted, mixing system 206 comprises container holder 208, spindle 210, mixer 212, and cap 214.

As depicted, container 216 is located in container holder 208. Cap 214 covers and seals first opening 218 in container 216. Mixer 212 extends into container 216 from spindle 210 through second opening 220. Mixer 212 is connected to spindle 210. As depicted, gasket 222 forms a seal around shaft 224 of mixer 212.

Gasket 222 enables spindle 210 to rotate about axis 226 such that mixer 212 also rotates. Axis 226 extends centrally through container 216 when container 216 is held in container holder 208.

Additionally, container holder 208 can move along axis 226 such that container 216 also moves along axis 226. In this illustrative example, mixer 212 does not move along axis 226. As a result, paddle 228 of mixer 212 can change locations within container 216 when mixing a base part and an activator part form a compounded material.

Further, in this illustrative example, cap 214 contains base part opening 230 and activator part opening 232. Base part opening 230 is connected to base part transport tube 234, and activator part opening 232 is connected to activator part transport tube 236.

As depicted, a base part can be pumped through base part transport tube 234 into container 216 through base part opening 230. In similar fashion, an activator part can be pumped through activator part transport tube 236 into container 216 through activator part opening 232.

Figure 3:
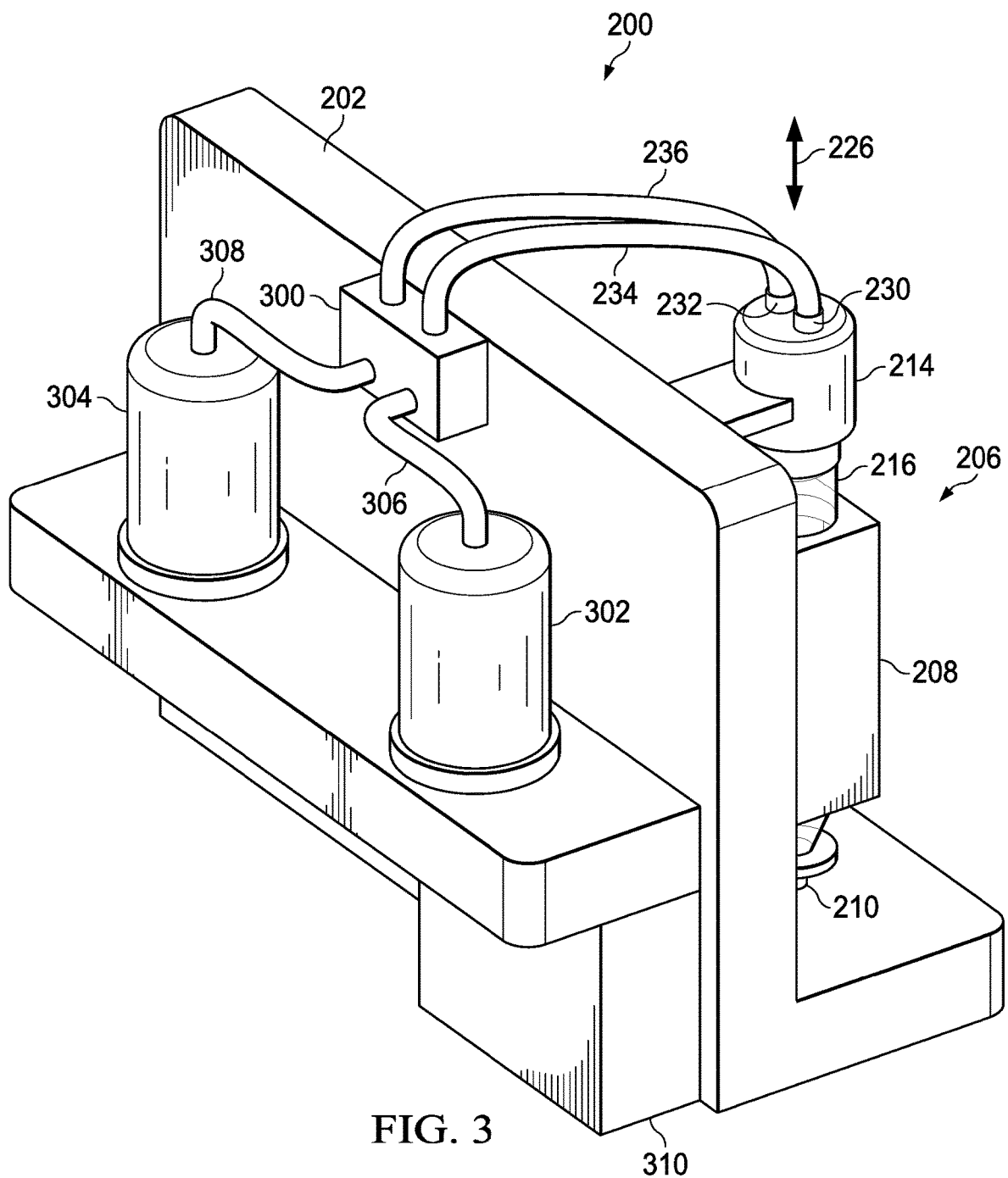
FIG. 3 is an illustration of a rear perspective view of a material mixing system in accordance with an illustrative embodiment.

With reference next to FIG. 3, an illustration of a rear perspective view of material mixing system 200 is depicted in accordance with an illustrative embodiment. In this view, pump 300 is seen connected to platform 202. Base part transport tube 234 and activator part transport tube 236 are connected to pump 300.

As depicted, base part source 302 and activator part source 304 are depicted as connected to platform 202. This connection is also an optional connection and one or both of these two sources can be connected to or located on another platform or structure instead of platform 202.

In this illustrative example, base part source 302 is connected to pump 300 by base part source transport tube 306. As depicted, activator part source 304 is connected to pump 300 by activator part source transport tube 308.

Also depicted in this view of material mixing system 200 is motor 310. Motor 310 is a part of mixing system 206 and operates to rotate spindle 210 and to move container holder 208. In this illustrative example, mixing system 206 also includes a gear system (not shown) or other mechanical connectors (not shown) that connect motor 310 to spindle 210 and container holder 208.

Figure 4:
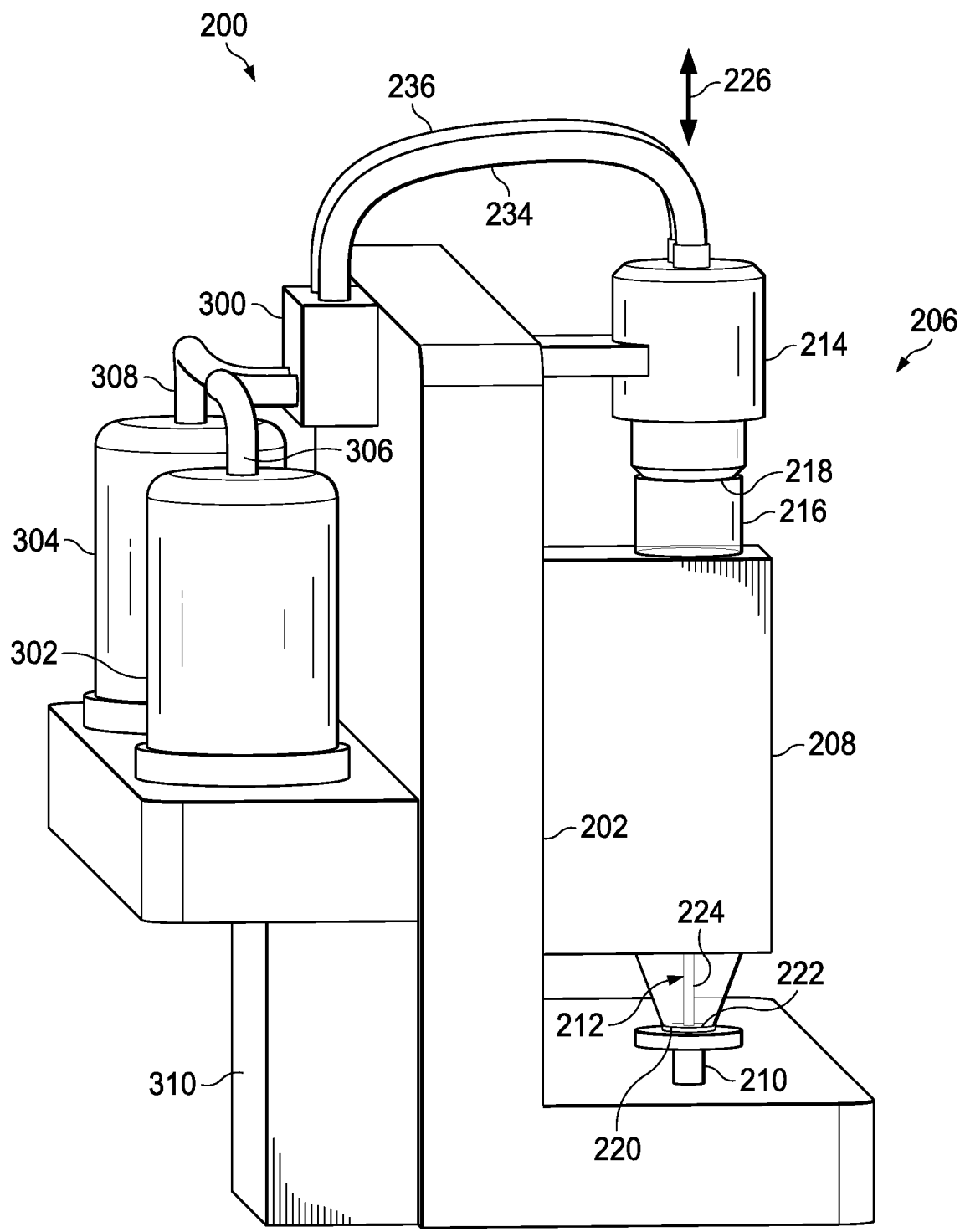
FIG. 4 is an illustration of a side view of a material mixing system in accordance with an illustrative embodiment.

Turning next to FIG. 4, an illustration of a side view of material mixing system 200 is depicted in accordance with an illustrative embodiment. When the compounded material has been mixed, container 216 containing the compounded material can be removed from platform 202. A plunger (not shown) can be placed into first opening 218. In this manner, container 216 can become part of an injection system for directing the compounded material to a structure for manufacturing or maintenance of a product. The compounded material can be moved out of container 216 through second opening 220 as the plunger is moved through first opening 218.

In this manner, a human operator may apply the compounded material to a structure for manufacturing or performing maintenance on the structure for a product. In another illustrative example, container 216 with the plunger can be attached to a robotic arm or other automated system for use in applying the compounded material to the structure.

The illustration of material mixing system 200 in FIGS. 2-4 are presented for purposes of illustrating one manner in which material mixing system 110 shown in block form in FIG. 1 can be implemented. This illustration is not meant to limit the manner in which other material mixing systems can be implemented. For example, controller 204 can be a distributed controller. For example, a portion of controller 204 can be connected to platform 202 while another portion of controller 204 can be a remote location. The local portion of controller 204 connected to platform 202 can include hardware that operates to control the operation of components such as mixing system 206 and pump 300. The remote portion of controller 204 can perform steps needed to determine the amounts of a base part and an activator part needed to generate a command or commands over a wired or wireless communications particular amount of a compounded material. Based on those calculations, the remote portion of controller 204 can send instructions over a communications link to the local portion of controller 204 to mix the appropriate portions of the base and activator to form the compounded material.

In yet another illustrative example, spindle 210 can be located in cap 214 such that mixer 212 extends through first opening 218 of container 216. With this example, second opening 220 may be unnecessary.

In yet another illustrative example, the transport tubes can be connected directly from base part source 302 and activator part source 304 to base part opening 230 and activator part opening 232 in cap 214. In this alternative example, pump 300 can be an injection system that moves plungers within base part source 302 and activator part source 304 to cause the movement of the base part and the activator part through the transport tubes into container 216.

Figure 5:
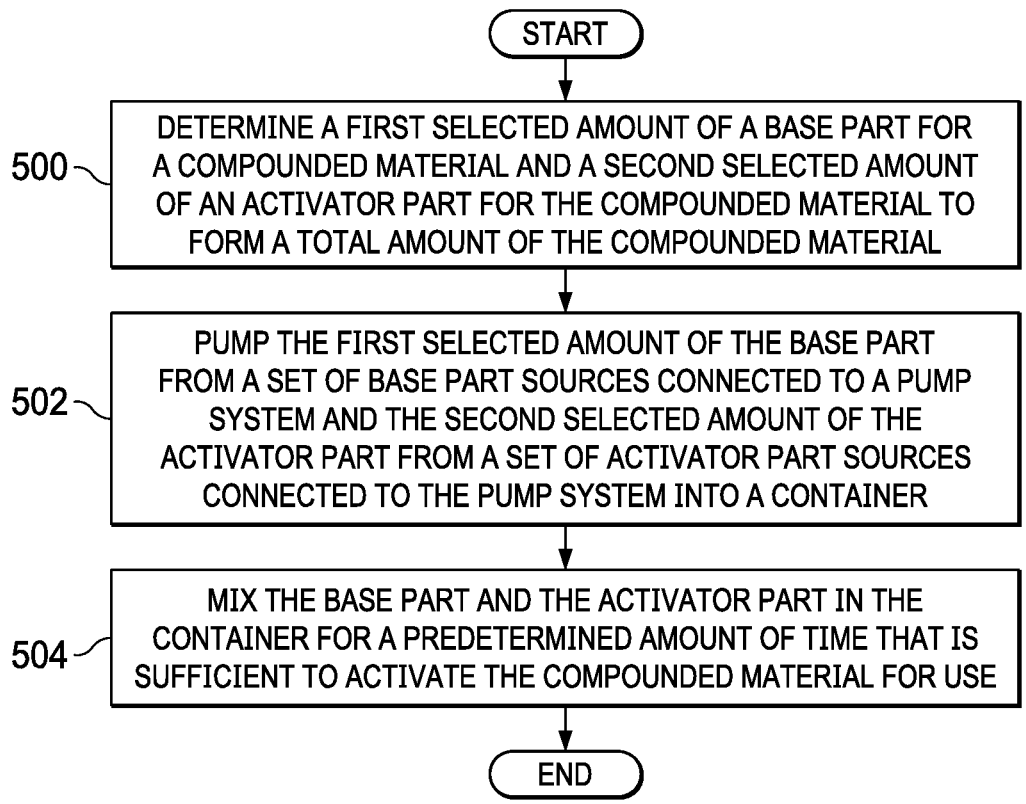
FIG. 5 is an illustration of a flowchart of a process for mixing a compounded material in accordance with an illustrative embodiment.

Turning next to FIG. 5, an illustration of a flowchart of a process for mixing a compounded material is depicted in accordance with an illustrative embodiment. The process in FIG. 5 can be implemented in hardware, software, or both. When implemented in software, the process can take the form of program code that is run by one of more processor units located in one or more hardware devices in one or more computer systems. For example, the process can be implemented in controller 116 to control the operation of material mixing system 110 in FIG. 1.

The process begins by determining a first selected amount of a base part for a compounded material and a second selected amount of an activator part for the compounded material to form a total amount of the compounded material (operation 500). In this illustrative example, a controller may access a table, a spreadsheet, a database, or some other data structure that identifies the first selected amount of the base part and the second selected amount of the activator part that is needed for a particular total amount of the compounded material.

The process pumps the first selected amount of the base part from a set of base part sources connected to a pump system and the second selected amount of the activator part from a set of activator part sources connected to the pump system into a container (operation 502). The controller controls the operation of the pump system to pump the selected amounts of the base part and the activator part into the container.

The process mixes the base part and the activator part in the container for a predetermined amount of time that is sufficient to activate the compounded material for use (operation 504). The process terminates thereafter. In this illustrative example, the mixing is performed using a mixing system under the control of the controller.

Figure 6:
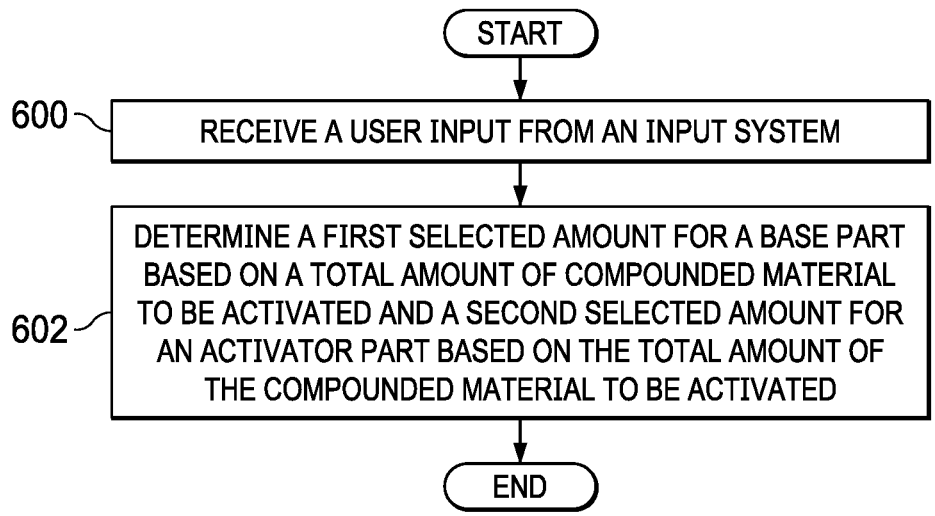
FIG. 6 is an illustration of a flowchart of a process for determining selected amounts of a base part and an activator part in accordance with an illustrative embodiment.

With reference next to FIG. 6, an illustration of a flowchart of a process for determining selected amounts of a base part and an activator part is depicted in accordance with an illustrative embodiment. The process illustrated in FIG. 6 is an example of one implementation for operation 500 in FIG. 5.

The process begins by receiving a user input from an input system (operation 600). In operation 600, the user input includes a total amount of compounded material to be activated.

The process determines a first selected amount for the base part based on the total amount of the compounded material to be activated and a second selected amount for an activator part based on a total amount of compounded material to be activated (operation 602). The process terminates thereafter.

Figure 7:
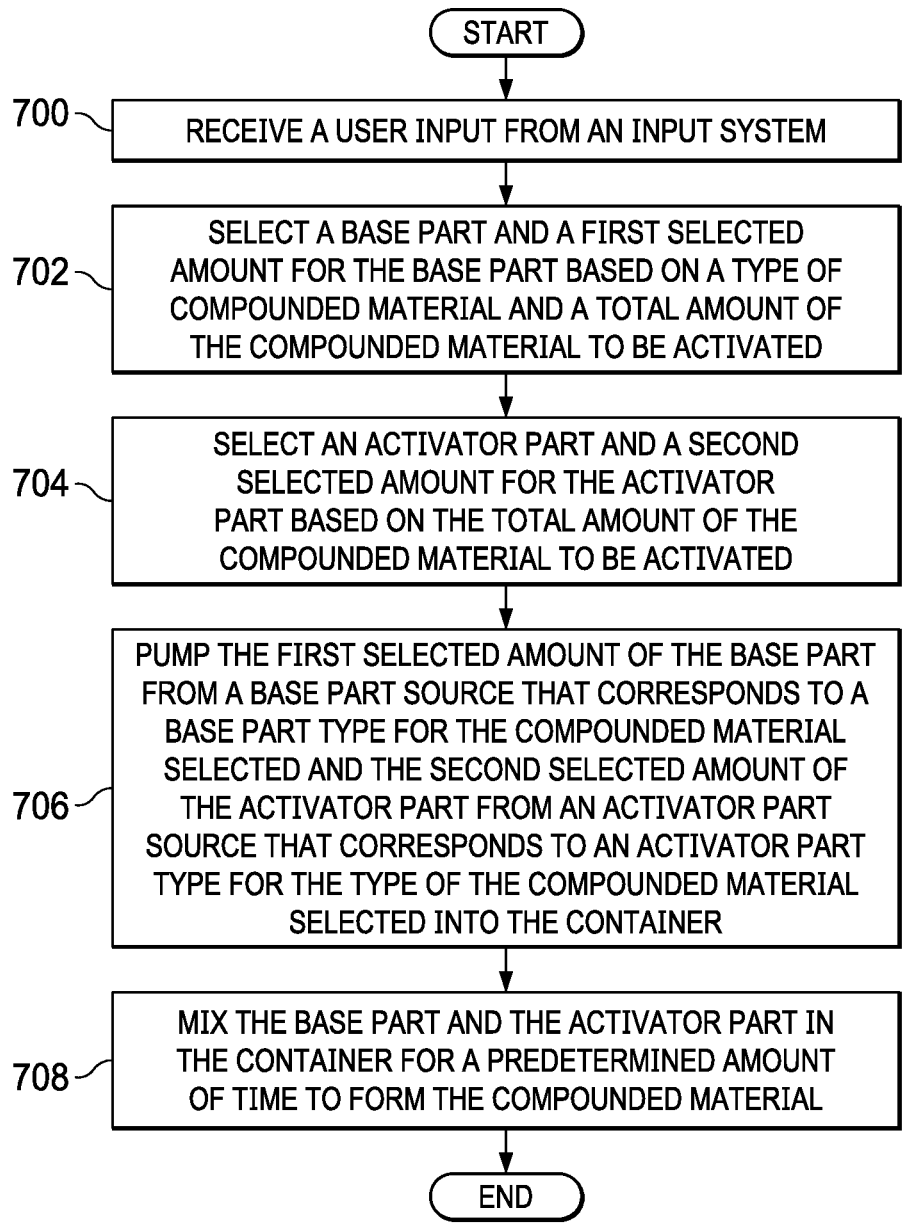
FIG. 7 is an illustration of a flowchart of a process for mixing a compounded material is depicted in accordance with an illustrative embodiment.

Turning next to FIG. 7, an illustration of a flowchart of a process for mixing a compounded material is depicted in accordance with an illustrative embodiment. The process in FIG. 7 can be implemented in hardware, software, or both. When implemented in software, the process can take the form of program code that is run by one of more processor units located in one or more hardware devices in one or more computer systems. For example, the process can be implemented in controller 116 to control the operation of material mixing system 110 in FIG. 1.

The process begins by receiving a user input from an input system (operation 700). In operation 700, the user input includes an identification of a type of compounded material and a total amount of the compounded material to be activated.

The process selects a base part and a first selected amount for the base part based on a type of compounded material and a total amount of the compounded material to be activated (operation 702). The process selects an activator part and a second selected amount for the activator part based on the total amount of the compounded material to be activated (operation 704).

The process pumps the first selected amount of the base part from a base part source that corresponds to a base part type for the compounded material selected and the second selected amount of the activator part from an activator part source that corresponds to an activator part type for the type of the compounded material selected into the container (operation 706).

The process mixes the base part and the activator part in the container for a predetermined amount of time to form the compounded material (operation 708). The process terminates thereafter. The predetermined amount of time for mixing the parts to form the compounded material in a state that is suitable for use can be determined from manufacturer specifications. This information can be located in a table, a spreadsheet, a database, or some other data structure.

The flowcharts and block diagrams in the different depicted embodiments illustrate the architecture, functionality, and operation of some possible implementations of apparatuses and methods in an illustrative embodiment. In this regard, each block in the flowcharts or block diagrams can represent at least one of a module, a segment, a function, or a portion of an operation or step. For example, one or more of the blocks can be implemented as program code, hardware, or a combination of the program code and hardware. When implemented in hardware, the hardware can, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams can be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 8:
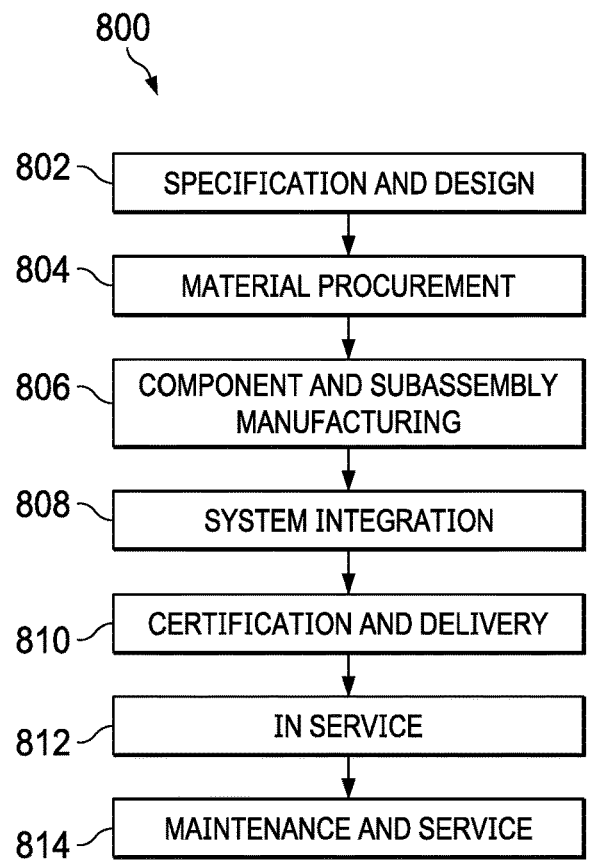
FIG. 8 is an illustration of a flowchart of an aircraft manufacturing and service method in accordance with an illustrative embodiment.
Figure 9:
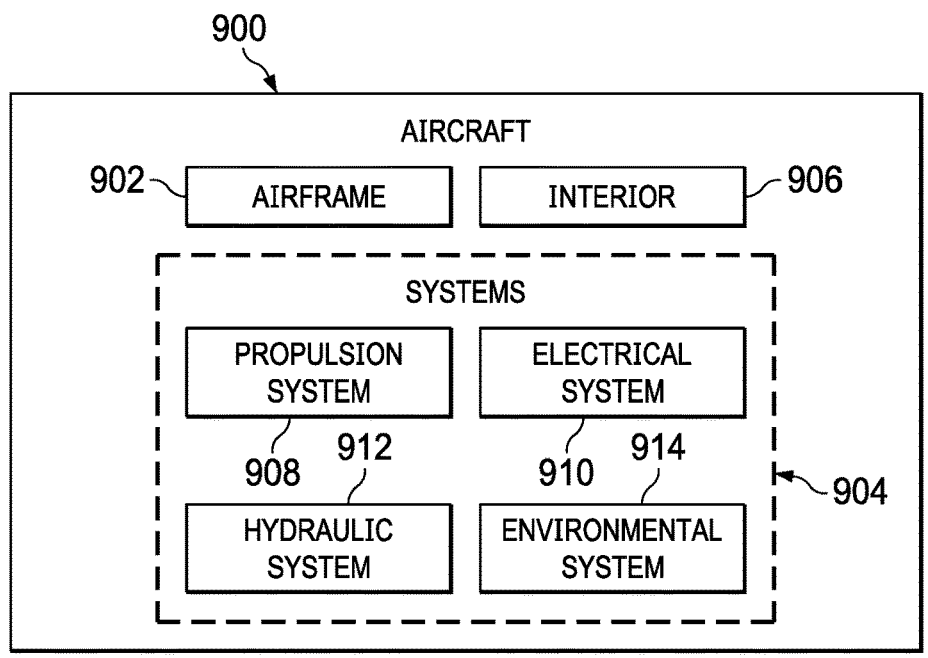
FIG. 9 is an illustration of a block diagram of an aircraft in which an illustrative embodiment may be implemented.

Illustrative embodiments of the disclosure may be described in the context of aircraft manufacturing and service method 800 as shown in FIG. 8 and aircraft 900 as shown in FIG. 9. Turning first to FIG. 8, an illustration of a flowchart of an aircraft manufacturing and service method is depicted in accordance with an illustrative embodiment. During pre-production, aircraft manufacturing and service method 800 may include specification and design 802 of aircraft 900 in FIG. 9 and material procurement 804.

During production, component and subassembly manufacturing 806 and system integration 808 of aircraft 900 in FIG. 9 takes place. Thereafter, aircraft 900 in FIG. 9 can go through certification and delivery 810 in order to be placed in service 812. While in service 812 by a customer, aircraft 900 in FIG. 9 is scheduled for routine maintenance and service 814, which may include modification, reconfiguration, refurbishment, and other maintenance or service.

Each of the processes of aircraft manufacturing and service method 800 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 9, an illustration of an aircraft is depicted in which an illustrative embodiment may be implemented. In this example, aircraft 900 is produced by aircraft manufacturing and service method 800 in FIG. 8 and may include airframe 902 with plurality of systems 904 and interior 906. Examples of systems 904 include one or more of propulsion system 908, electrical system 910, hydraulic system 912, and environmental system 914. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 800 in FIG. 8.

In one illustrative example, components or subassemblies produced in component and subassembly manufacturing 806 in FIG. 8 can be fabricated or manufactured in a manner similar to components or subassemblies produced while aircraft 900 is in service 812 in FIG. 8. As yet another example, one or more apparatus embodiments, method embodiments, or a combination thereof can be utilized during production stages, such as component and subassembly manufacturing 806 and system integration 808 in FIG. 8. One or more apparatus embodiments, method embodiments, or a combination thereof may be utilized while aircraft 900 is in service 812, during maintenance and service 814 in FIG. 8, or both. For example, material mixing system 110 in FIG. 1 can be used to mix compounded material 102 for use during at least one of component and subassembly manufacturing 806 or system integration 808 in FIG. 8. Additionally, material mixing system 110 in FIG. 1 can be used to mix compounded material 102 for use during routine maintenance and service 814, which may include modification, reconfiguration, refurbishment, and other maintenance or service.

The use of a number of the different illustrative embodiments may substantially expedite the assembly of aircraft 900, reduce the cost of aircraft 900, or both expedite the assembly of aircraft 900 and reduce the cost of aircraft 900. For example, material mixing system 110 in FIG. 1 can be used to mix the desired amount of compounded materials for use in performing at least one of manufacturing or maintenance on aircraft 900. By mixing the desired amount for the compounded material, the desired amount of the compounded material can be created without excess material being left over that may be wasted when using current techniques in which preselected packages are used to mix the compounded material.

Figure 10:
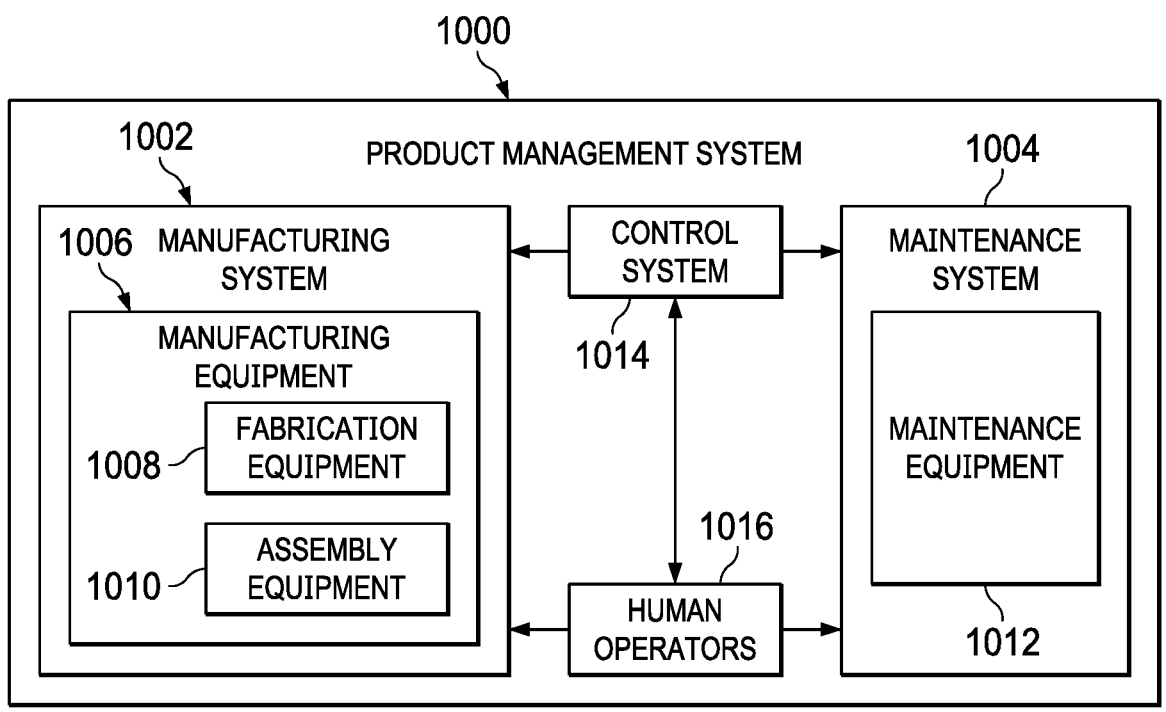
FIG. 10 is an illustration of a block diagram of a product management system is depicted in accordance with an illustrative embodiment.

Turning now to FIG. 10, an illustration of a block diagram of a product management system is depicted in accordance with an illustrative embodiment. Product management system 1000 is a physical hardware system. In this illustrative example, product management system 1000 includes at least one of manufacturing system 1002 or maintenance system 1004.

Manufacturing system 1002 is configured to manufacture products, such as aircraft 900 in FIG. 9. As depicted, manufacturing system 1002 includes manufacturing equipment 1006. Manufacturing equipment 1006 includes at least one of fabrication equipment 1008 or assembly equipment 1010.

Fabrication equipment 1008 is equipment that used to fabricate components for parts used to form aircraft 900 in FIG. 9. For example, fabrication equipment 1008 can include machines and tools. These machines and tools can be at least one of a drill, a hydraulic press, a furnace, a mold, a composite tape laying machine, a vacuum system, a lathe, or other suitable types of equipment. Fabrication equipment 1008 can be used to fabricate at least one of metal parts, composite parts, semiconductors, circuits, fasteners, ribs, skin panels, spars, antennas, or other suitable types of parts.

Assembly equipment 1010 is equipment used to assemble parts to form aircraft 900 in FIG. 9. In particular, assembly equipment 1010 is used to assemble components and parts to form aircraft 900 in FIG. 9. Assembly equipment 1010 also can include machines and tools. These machines and tools may be at least one of a robotic arm, a crawler, a faster installation system, a rail-based drilling system, or a robot. Assembly equipment 1010 can be used to assemble parts such as seats, horizontal stabilizers, wings, engines, engine housings, landing gear systems, and other parts for aircraft 900 in FIG. 9.

In this illustrative example, maintenance system 1004 includes maintenance equipment 1012. Maintenance equipment 1012 can include any equipment needed to perform maintenance on aircraft 900 in FIG. 9. Maintenance equipment 1012 may include tools for performing different operations on parts on aircraft 900 in FIG. 9. These operations can include at least one of disassembling parts, refurbishing parts, inspecting parts, reworking parts, manufacturing replacement parts, or other operations for performing maintenance on aircraft 900 in FIG. 9. These operations can be for routine maintenance, inspections, upgrades, refurbishment, or other types of maintenance operations.

In the illustrative example, maintenance equipment 1012 may include ultrasonic inspection devices, x-ray imaging systems, vision systems, drills, crawlers, and other suitable devices. In some cases, maintenance equipment 1012 can include fabrication equipment 1008, assembly equipment 1010, or both to produce and assemble parts that needed for maintenance.

Product management system 1000 also includes control system 1014. Control system 1014 is a hardware system and may also include software or other types of components. Control system 1014 is configured to control the operation of at least one of manufacturing system 1002 or maintenance system 1004. In particular, control system 1014 can control the operation of at least one of fabrication equipment 1008, assembly equipment 1010, or maintenance equipment 1012.

The hardware in control system 1014 can be implemented using hardware that may include computers, circuits, networks, and other types of equipment. The control may take the form of direct control of manufacturing equipment 1006. For example, robots, computer-controlled machines, and other equipment can be controlled by control system 1014. In other illustrative examples, control system 1014 can manage operations performed by human operators 1016 in manufacturing or performing maintenance on aircraft 900. For example, control system 1014 can assign tasks, provide instructions, display models, or perform other operations to manage operations performed by human operators 1016. In these illustrative examples, controller 116 in FIG. 1 can be implemented in control system 1014 to mix a compounded material from a base part and an activator part use in performing at least one of the manufacturing or maintenance of aircraft 900 in FIG. 9.

In the different illustrative examples, human operators 1016 can operate or interact with at least one of manufacturing equipment 1006, maintenance equipment 1012, or control system 1014. This interaction can occur to manufacture aircraft 900 in FIG. 9.

Of course, product management system 1000 may be configured to manage other products other than aircraft 900 in FIG. 9. Although product management system 1000 has been described with respect to manufacturing in the aerospace industry, product management system 1000 can be configured to manage products for other industries. For example, product management system 1000 can be configured to manufacture products for the automotive industry as well as any other suitable industries.

Thus, the illustrative examples provide a method, apparatus, and system for mixing a compounded material. A first selected amount of a base part for the compounded material and a second selected amount of an activator part for the compounded material to form a total amount of the compounded material is determined. The first selected amount of the base part is pumped by a pump system from a set of base part sources connected to the pump system into a container. The second selected amount of the activator part is pumped by the pump system from a set of activator part sources connected to the pump system into the container. The base part and the activator part in the container are mixed by a mixing system for a predetermined amount of time that is sufficient to activate the compounded material for use.

In one or more illustrative examples, the compounded material can be mixed in a selected amount. The selected amounts can be based on an amount of compounded material needed rather than based on prepackaged mixes that may provide more compounded material than needed. Thus, with the ability to select a customize amount of compounded material, waste and costs associated with the waste of excess compounded material is reduced or eliminated using a material mixing system as described in the different illustrative examples.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, To the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A material mixing system that comprises:
   a cap configured to connect to:
     a transport system; and
     a container that comprises:
       a first opening at a first end configured to receive the cap;
       a central axis;
       a second opening at a second end that comprises a gasket that encircles:
         the central axis; and
         a shaft, disposed within the container, that comprises a mixer selected from a set of mixers;
   a container holder configured to receive, retain, and move the container along the central axis;
   a pump system, wherein the pump system is configured to pump a base part and an activator part of a compounded material into the container through the transport system;
   a mixing system, wherein the mixing system is configured to:
     connect to the shaft; and
     mix the base part and the activator part of the compounded material in the container; and
   a controller in communication with the pump system and the mixing system, wherein the controller is configured to:
     control the pump system to pump a first selected amount of the base part and a second selected amount of the activator part into the container in which the first selected amount and the second selected amount is based on a total amount of activated compounded material desired; and
     control the shaft and the container holder to mix the base part and the activator part in the container when in the container holder for a predetermined amount of time that is sufficient to activate the compounded material for use.

2. The material mixing system of claim 1, wherein the pump system comprises:
   a first set of pumps configured to pump base parts; and
   a second set of pumps configured to pump activator parts.

3. The material mixing system of claim 2, further comprising:
   the second opening configured to dispense the activated compounded material;
   a set of base part sources connected to the first set of pumps; and
   a set of activator part sources connected to the second set of pumps.

4. The material mixing system of claim 3, wherein the set of base part sources correspond to a set of types of base parts and the set of activator part sources correspond to a set of types of activator parts.

5. The material mixing system of claim 3, wherein the controller is configured to:
   select sources from the set of base part sources and the set of activator part sources to create a type of compounded material that is desired based upon the type of compounded material, a type of base part, and a type of activator part.

6. The material mixing system of claim 3, further comprising:
the container further configured to:
retain the activated compounded material;
detach from the container holder;
engage with a compounded material injection system; and
dispense the activated compounded material through the second opening; and
the transport system configured to connect the pump system to the set of base part sources and the set of activator part sources.

7. The material mixing system of claim 6, wherein the transport system is comprised of at least one of: a tube, a rigid tube, a flexible tube, a hose, a conduit, a hollow cylinder, a pipe, or some other hollow structure.

8. The material mixing system of claim 1, further comprising:
an input system in communication with the controller and configured to:
receive a user input of the total amount of the compounded material to be activated; and
send the user input to the controller.

9. The material mixing system of claim 5, wherein the input system is selected from at least one of a physical control, a human machine interface, a touch screen display, a mobile phone, a tablet computer, a client computer, smart glasses, or a server computer.

10. The material mixing system of claim 8, wherein the controller is further configured to:
receive the user input from the input system, wherein the user input includes the total amount of the compounded material to be activated;
determine the first selected amount for the base part based on the total amount of the compounded material to be activated: and
determine the second selected amount for the activator part based on the total amount of the compounded material to be activated.

11. The material mixing system of claim 8, wherein the controller is further configured to:
receive the user input from the input system, wherein the user input includes an identification of a type of the compounded material and the total amount of the compounded material to be activated;
select the base part and the activator part based on the type of the compounded material; and
select the first selected amount for the base part and the second selected amount for the activator part based on the type of the compounded material and the total amount of the compounded material to be activated.

12. The material mixing system of claim 11, wherein the controller is further configured to control the pump system to pump:
the first selected amount of the base part from a base part source that corresponds to a base part type for the compounded material selected into the container; and
the second selected amount of the activator part from an activator part source that corresponds to an activator part type for the type of the compounded material selected into the container.

13. The material mixing system of claim 1, wherein the mixing system further comprises a spindle configured to rotate about the central axis with the container in the container holder.

14. The material mixing system of claim 13, wherein the spindle is configured to:
rotate about the central axis; and
engage and move the shaft and the mixer selected from the set of mixers such that the base part and the activator part in the container are mixed.

15. The material mixing system of claim 14, wherein the set of mixers comprises at least one of: a static mixer, a mixing paddle, a whisk, a beater, or a spiral mixer.

16. The material mixing system of claim 1, wherein the activated compounded material is at least one of: a paste, a silicon sealant, a polysulfide sealant, a urethane sealant, an epoxy adhesive, a solvent free adhesive, a resin, an epoxy, and combinations thereof.

17. The material mixing system of claim 1 further comprising:
the transport system configured to connect the pump system to the container.

18. The material mixing system of claim 1 further comprising:
the transport system configured to:
transport the base part from a set of base part sources to the container; and
transport the activator part from the set of activator part sources to the container.

19. The material mixing system of claim 1, wherein the controller is configured to communicate with the pump system and the mixing system via a wireless communications link.

20. The material mixing system of claim 1 further comprising:
the cap configured to cover and seal the first opening in the container.

* * * * *